Feb. 18, 1969  R. L. HANDY ET AL  3,427,871
METHOD AND APPARATUS FOR IN SITU BORE HOLE TESTING
Filed July 11, 1966
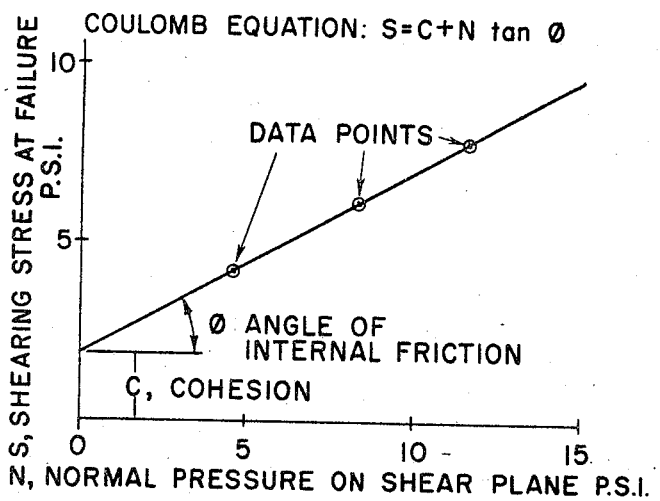
Fig. 1
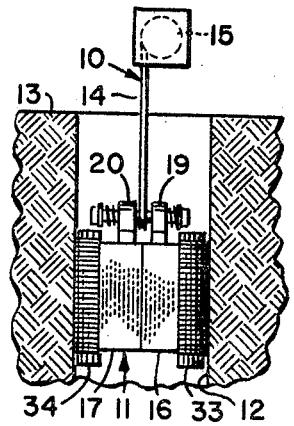
Fig. 2
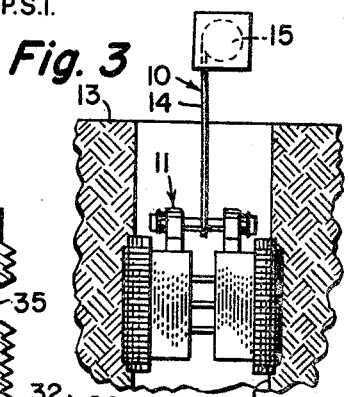
Fig. 3
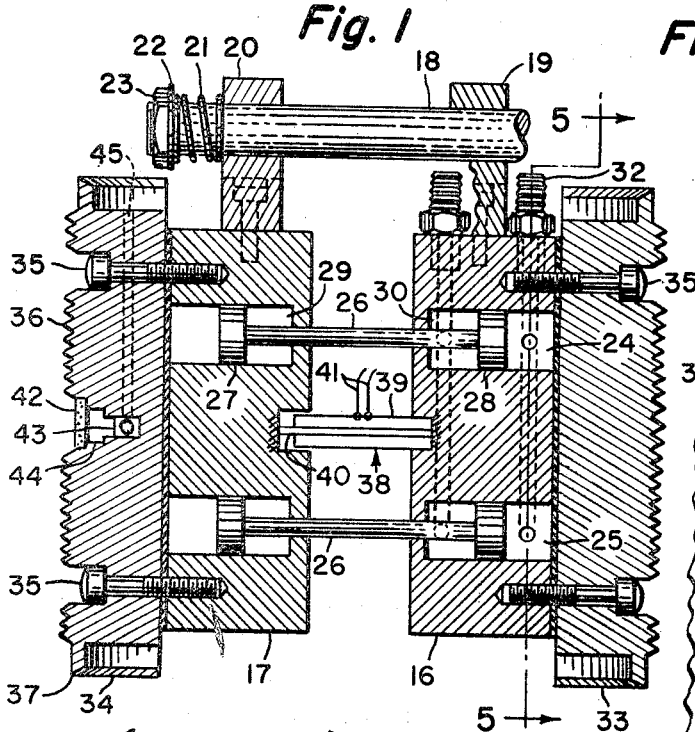
Fig. 4
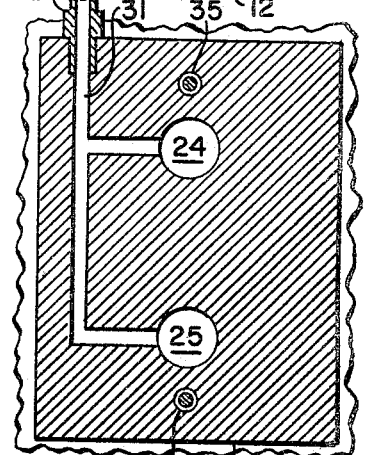
Fig. 5
Fig. 6
INVENTORS
Richard L. Handy
Nathaniel S. Fox
BY
Dawson, Tilton, Fallon,
Lungmus and Alexander
ATTORNEYS

United States Patent Office 3,427,871
Patented Feb. 18, 1969

3,427,871
METHOD AND APPARATUS FOR IN SITU BORE HOLE TESTING
Richard L. Handy, Des Moines, and Nathaniel S. Fox, Ames, Iowa, assignors to Iowa State University Research Foundation, Inc., Ames, Iowa, a corporation of Iowa
Filed July 11, 1966, Ser. No. 564,189
U.S. Cl. 73—84
Int. Cl. G01n 3/24
8 Claims

ABSTRACT OF THE DISCLOSURE

An expansible testing device is lowered into a bore hole; and the device is expanded to exert a predetermined normal pressure on the side walls of the bore hole. The pressure surfaces of the device are grooved for promoting interlocking with the soil and minimizing slippage of the soil relative to the device during shearing. The pressure is exerted by feeding fluid pressure into cylinder and piston rod units interconnecting the two expansible surfaces of the device. After the predetermined normal pressure is exerted against the wall, the device is pulled longitudinally of the hole to cause shearing of the soil. The force required for shearing is measured. The normal pressure is increased to a second predetermined value; and the device is again pulled to cause a second shearing. By plotting the normal pressure against the required shearing stress, the angle of internal friction and the cohesion coefficient of the soil may be determined.

---

This invention relates generally to apparatus for measuring the shearing strength of soils, and more particularly to apparatus for measuring basic shearing strength parameters of soils in place, thereby eliminating the necessity of undisturbed sampling and laboratory testing.

Resistance of soil to shear failure is a function of two parameters: $\phi$, the angle of internal friction, and $c$, the cohesion or cohesive shear strength. The shearing resistance of any soil is approximately described by the Coulomb equation:

$$S = c + N \tan \phi$$

where S is the shearing resistance, $c$ is the cohesion, N is the pressure normal to the shear plane, and $\phi$ is the angle of friction. S, $c$, and N are all expressed in force per unit area, as for example pounds per square inch.

At present, soil parameters $c$ and $\phi$ are determined by laboratory testing of undisturbed samples. The soil either is sampled by hand trimming, or by pushing into the soil a thin-walled cylindrical tube termed a Shelby tube. Several types of laboratory tests may be run, all involving confinement of the soil under pressure and simultaneously shearing it with an applied load. In the *direct shear test* a short cylinder of soil is loaded axially with a vertical load N, and sheared on a plane normal to N in a shear box, the top half of which can be made to slide laterally with respect to the bottom half. In the triaxial test a cylinder of soil is sealed in a membrane, confined laterally with fluid pressure, and loaded vertically until it fails or breaks. In this test the orientation of the shear plane varies, so $c$ and $\phi$ must be calculated from Mohr theory. Using either of these laboratory shear tests, the procedure is to test two or three samples (the third for a check) at different values of confining pressure in order to establish the straight-line Coulomb relationship, from which can be obtained $c$ and $\phi$. These two parameters may then be used in many soil mechanics equations to solve for foundation or highway bearing capacity, stability of slopes, levees, earth dams, retaining walls, piling, underground conduits, etc.

The object of this invention is to allow tests for $c$ and $\phi$ to be conducted in the field, without the necessity for obtaining undisturbed samples for time-consuming laboratory testing. Our test is conducted inside a bored hole of the type usually made during site explorations. Presently two categories of bore-hole tests are commonly performed: One is a *penetration resistance test*, in which a standard cone or cylindrical sampler is pushed or driven into the bottom of the hole, and the penetration resistance recorded. In some instances a correction is made for lateral skin friction on the probing tool by measuring the force to pull it after it is pushed or driven, or by use of a special accessory. Whether thus corrected or not, the penetration is an empirical measure of soil-bearing capacity, the exact relationship depending on the kind of soil. For example, a "standard penetration test blow count" of 40 in a clay means a substantially different bearing capacity than a value of 40 in a sand. The reason for this is that the penetration tests do not distinguish between the two basic soil shear strength parameters $c$ and $\phi$, but are influenced by them collectively. Furthermore, although pulling the probe does give a measure of skin friction on the probe, the value is meaningless because there is no provision for measuring the lateral pressure (N) of the soil on the probe.

A second category of field bore-hole tests is the *vane shear test*. In this procedure a usually four-bladed vertically-oriented vane is pushed downward into soil at the bottom of the hole; the vane is then twisted so as to cause a circumferential failure of the soil, and the torque required for failure recorded. The vane shear test gives a more direct measure of shearing strength than do penetration tests, and attempts have been made to separate the influence of $c$ and $\phi$ by comparing results from 4-bladed and 6-bladed vanes, but because of the indirect nature of this method the accuracy is not good.

Another disadvantage of the bore-hole tests in common use is that they must be run "blind" in soil beneath the bottom of a hole. Therefore if a test must be repeated, or a soft stratum was not anticipated and was bored through without testing, the only way to test is to drill a new hole. An exception is the apparatus of Menard as seen in U.S. Patent 2,957,341, which measures the increase in bore-hole diameter relative to the pressure inside an inflatable packer introduced into the hole. Although Menard's instrument provides a measure of soil compressibility around a bore hole, it does not measure, nor is it designed to measure, the two separate soil shearing strength parameters $c$ and $\phi$.

The device described herein departs from previous devices both in concept and in geometry. Firstly, as with the apparatus of Menard, our device tests soil at the sides of a bore hole; therefore the hole can be bored to full depth and the successive strata identified and described, and the critical strata selected for test at any desired depth in the open hole.

Secondly, unlike Menard, our device separates the effects of cohesion and angle of friction $\phi$, and measures them independently in the manner of a direct shear test. Our apparatus in effect performs a direct shear test on the sides of a bore hole.

Thirdly, the combination of the above two factors yields results obtained "on the spot," such that the tests may be repeated if necessary, since they tell in a few minutes what formerly required hours or days to determine.

The advantageous features of our invention include the ability that it may be lowered or inserted in a drill hole; that it may be expanded to engage soil at the sides of the drill hole; that the pressure of the device on the sides of the hole may be controlled, measured, and recorded (this pressure representing N in above-given equation); that the device may be either pushed or pulled along the axis of the hole to cause a longitudinal displacement and shear failure of soil at the sides of the hole; and that the force for this movement may be controlled, measured and recorded (this force relating to S in the above equation). Two tests at different values of lateral pressure N are sufficient to solve Equation 1 for the desired soil properties, $c$ and $\phi$. Since a single test requires one to 15 minutes, the tests are ordinarily repeated several times at different values of N to insure validity of the data.

Other objects and advantages of the invention may be seen in the details of construction and operation set down in this specification.

This invention is described in conjunction with the accompanying drawing, in which—

FIG. 1 is a graph of the Coulomb equation describing soil shear strength;

FIG. 2 is a fragmentary sectional view of a bore hole seen with the inventive apparatus being inserted therein;

FIG. 3 is a view similar to FIG. 2 but with the apparatus in expanded condition and in the procedure of being withdrawn from the bore hole so as to establish the parameters necessary for substitution in the equation of FIG. 1;

FIG. 4 is an enlarged sectional view of the expanded apparatus as would be seen along line 4—4 of FIG. 6;

FIG. 5 is a fragmentary sectional view taken along the line 5—5 applied to FIG. 4; and FIG. 6 is a bottom view of the apparatus.

In the illustration given, and with particular reference to FIGS. 2 and 3, the numeral 10 designates generally apparatus embodying the teachings of this invention. More particularly, the apparatus 10 includes a drive 11 which is adapted to be inserted into a hole 12 within the ground 13, being attached by means of a cable 14 to a dynamometer-equipped jacking arrangement as at 15.

Briefly, the purpose of the device 11 is to be expanded to the condition 11' seen in FIG. 3 with a predetermined pressure N applied to achieve the expansion and thereafter the device 11' is raised by operation of the jack 15 to give a value S. With these two values known, a point can be plotted on a graph corresponding to the Coulomb equation and, if the shear strength is such that the curve passes through the origin, the slope can be determined and hence the angle $\phi$. Where the curve does not pass through the origin, operation of the apparatus 10 at a different expansion pressure N will yield additional data points as indicated in FIG. 1, thereby giving an indication of the slope and intercept with the ordinate axis. From this, the parameters of the Coulomb equation can be determined for any given soil. This, of course, is important in construction, i.e., buildings, roads, etc.

For the purpose of effecting expansion of the device 11 to the condition shown in FIG. 3 as 11', we provide two shoe-equipped blocks 16 and 17 (see FIG. 4). These are slidably mounted on a transverse member 18 (transverse to the length of the hole 12). The member 18 slidably engages integral pedestals 19 and 20 on the blocks 16 and 17. The ends of the member 18 are equipped with springs 21 held in place by washers 22 and nuts 23 (designated only in the lefthand portion of FIG. 4).

For controlling the degree of separation of blocks 16 and 17, we provide a pair of cylinder and piston rod units generally designated 24 and 25. Each unit is equipped with a piston made up of a rod 26 carrying piston elements 27 and 28 at the ends thereof. The pistons 27 and 28 are slidably mounted within cavities 29 and 30 provided in the blocks 17 and 16, respectively, and pressure fluid is introduced through suitably contoured passages as at 31 in FIG. 5. The showing relative to block 17 has been omitted for the sake of clarity.

In operation, the introduction of pressure fluid through the fittings 32, results in moving the blocks 16 and 17 apart (and the corresponding cylindrical shoes 33 and 34) until the pressure of the fluid is equalized by the resistance of the soil defining the wall of the hole 12. The operation of the inventive apparatus, in greater detail, is as follows:

(1) The hole is augered or bored to the approximate diameter of the generally cylindrical segmental shoes 33 and 34. To be explained in greater detail hereinafter is the fact that each block 16 and 17 is equipped with a cylindrical segmental face plate as at 33 and 34 for the purpose of actually engaging the walls of the hole 12.

(2) From examination of the cuttings or sample obtained from the hole, the various strata are identified and the depth selected for tests.

(3) If necessary, the hole is cleaned using a thin-walled sharpened cylindrical cutter.

(4) The device 11 is then lowered, as seen in FIG. 2 and wherein the apparatus is in retracted condition—lowered to the depth required in the hole 12.

(5) By means of a hydraulic pump, the shoes 16 and 17 are expanded, i.e., moved apart, to engage the soil and to exert a normal pressure thereon of the order of 3 p.s.i. This is the condition of the device designated 11' in FIG. 3.

(6) By means of a drill rig, hydraulic jack, dynamometer-equipped winch or similar arrangement as at 15, the expanded device 11' is slowly pushed or pulled with simultaneous measurement of the force required to do this—as by means of a dynamometer—meanwhile holding the contact-pressure constant. Often soil dilates when it begins to shear, tending to increase contact pressure, which should be relieved. The shearing force normally reaches a maximum and then will fall off as the soil shears—the maximum force divided by the area of the shoes representing the shearing strength of the soil.

(7) Thereafter, the shearing force is reduced to 0 and the hydraulic pressure increased, ordinarily to 4 p.s.i. additionally, and the test repeated.

The two measurements are sufficient to define $c$ and $\phi$ for a given strata. However, because of the speed and simplicity of the test, four to six measurements are ordinarily obtained through repetition of steps 5 and 6 above. These data can be plotted on a graph shearing stress S versus normal pressure N. Ordinarily, all of the points fall in a straight line which defines $c$ and $\phi$ in FIG. 1.

Exceptions to data linearity fall in several categories: At low values of N, values of S may be too low, probably due to incomplete area contact of the shoes 16 and 17 with the soil. At high values of N, the line may curve toward lower S values especially in clays, partly because of development of pore pressure, and partly because this is the way clays behave. The pore pressure effect may be minimized by waiting at least five minutes between application of the normal force and application of the shearing load.

An alternate procedure is to move the instrument vertically slightly so that it will engage untested soil in the same stratum for each new test, then repeating steps 4, 5 and 6. Data so far indicate that these results do not differ appreciably from those obtained by testing in the same spot.

Typical test results are shown below compared to laboratory data from "quick" shear tests of untrimmed 3 inch diameter Shelby tube samples.

| Kind of Soil | Bore-Hole Tests | | Direct Shear Test | | Triaxial Shear Test | |
|---|---|---|---|---|---|---|
| | C., p.s.i. | $\phi$,° | C., p.s.i. | $\phi$,° | C., p.s.i. | $\phi$,° |
| Sand | 0.4 | 36.9 | 0.3 | 36.5 | 0.3 | 35.8 |
| Sandy Loam | 1.2 | 44.8 | 0.8 | 44.0 | | |
| Silt | 1.0 | 25.4 | 1.3 | 24.1 | 2.4 | 2.89 |
| Clay | 10.8 | 5.0 | | | 9.0 | 2.5 |

The facing elements or shoes 33 and 34 previously referred to are cylindrical segments secured to the blocks 16 and 17 by means of recessed bolts as at 35. The surface contours of the facing elements 33 and 34 are equipped with annular grooves as at 36 and for this purpose grooves of a size to occupy eight projections per inch of height are advantageous employed. Further, we provide a cutting edge at the top and bottom of perimeters of the facing elements 33 and 34—as at 37—for the purpose of eliminating any "bulldozing effect." It is seen that the cutting edges 37 are spaced slightly inwardly of the annular groove 36.

The annual grooves 36 are in effect elongated projections, the length of which is normal to the hole length and serve to minimize slipping of the device 11 in the direction of hole length and to maximize slippage of the soil in the direction transverse to the hole length.

In certain instances it is advantageous to know the exact degree of separation of the blocks 16 and 17 and for this purpose a strain-measuring device 38 is employed (see the central portion of FIG. 4). Such a device may take the form of a linear variable differential transformer operating on the electro-magnetic principle wherein the outer member 39 is fixed to the block 16 while the inner member (received within a bore in the number 39, the inner member being designated 40 is secured to the shoe 17). Thus, as the blocks 16 and 17 move apart, there is a change in the positions of the members 39 and 40 changing the current flowing through the conductors 41 and thus giving an indication of the degree of separation of the blocks 16 and 17.

In particular, this indicates when the soil has approximately reached the equilibrium compaction corresponding to the applied pressure—this occurring when the strain gauge indicates no substantial further separation of the shoes 16 and 17.

The numeral 42 designates a porous plug (as, for example, fritted bronze) that is fluid-penetrable to give in combination with a transducer 43, an indication of pore pressure. The plug 42 is mounted in the exterior face of the facing element 34 and communicates with transducer 43 by means of a passage 44. A vertically-extending passage 45 is provided in the facing member 34 for mounting of the wire conductors communicating the transducer with the ground.

While in the foregoing specification, a detailed description of the embodiment of the invention has been set down for the purpose of illustration, many variations in the details hereingiven may be made by those skilled in the art without departing from the spirit and scope of the invention.

We claim:

1. A device for determining the shear strength of soil comprising: first and second block means defining exterior pressure surfaces for engaging opposing interior surfaces of said bore hole, at least one of said block means defining a cavity; a cylinder and piston rod unit interconnecting said block means with said cylinder received in said cavity; transverse means slidably receiving said first and second block means for allowing relative movement thereof transverse of said hole while preventing relative movement thereof in a direction longitudinal of said hole; means including a source of fluid pressure coupled to said cavity for urging said first and second block means apart to exert a predetermined normal stress on the walls of said hole; and forcing means coupled to said device for urging the same longitudinally of said hole, said forcing means including means for measuring the applied force.

2. The device of claim 1 wherein said pressure surfaces define grooves extending transverse of said hole and the leading edge of each of said pressure surfaces further defines a knife edge conforming to the bore hole for cutting soil away when said device is urged longitudinally of said hole in the direction of said knife edges thereby preventing compression of said soil in said direction of movement.

3. The device of claim 1 wherein said transverse means further includes means for resiliently forcing said block means in contracted position for facilitating insertion of said device in said hole.

4. The device of claim 1 further comprising gauge means coupled between said blocks for measuring the separation of said first and second block means whereby an indication of equilibrium between the applied pressure and soil compaction may be given.

5. The device of claim 1 further comprising transducer means communicating with one of said surfaces for measuring the pore pressure at said surface.

6. A method of in situ determination of soil properties comprising: forming a bore hole in the soil under test; inducing a predetermined normal pressure on a side wall of said hole by forcing a pressure surface in positive engagement against said wall; then urging said surface longitudinally of said hole while maintaining said predetermined normal pressure until shearing occurs; measuring the force required for said shearing; inducing a predetermined second normal pressure on said side wall; then urging said surface longitudinally of said hole to cause a second shearing; and measuring said second shearing force, thereby to provide data for plotting the Coulomb relationship of the soil.

7. The method of claim 6 wherein said second normal pressure is greater than the first.

8. The method of claim 7 wherein said steps of inducing said normal pressure comprise: inserting an expansible device in said hole in a contracted state; and expanding said device to engage opposing interior surfaces of said hole with a predetermined force.

References Cited

UNITED STATES PATENTS

| 2,774,240 | 12/1956 | Fehlmann | 73—84 |
| 2,915,126 | 12/1959 | Potts | 166—212 X |
| 3,175,392 | 3/1965 | Tharalson et al. | 73—84 |
| 3,283,566 | 11/1966 | Fietz | 73—88 |

FOREIGN PATENTS

| 1,007,263 | 10/1965 | Great Britain. |

RICHARD C. QUEISSER, *Primary Examiner.*

JERRY W. MYRACLE, *Assistant Examiner.*

U.S. Cl. X.R.

73—101, 151